(12) United States Patent
Hefler et al.

(10) Patent No.: US 6,575,137 B2
(45) Date of Patent: Jun. 10, 2003

(54) PISTON AND BARREL ASSEMBLY WITH STEPPED TOP AND HYDRAULICALLY-ACTUATED FUEL INJECTOR UTILIZING SAME

(75) Inventors: Gregory W. Hefler, Chillicothe, IL (US); Shikui K. Chen, Canton, MI (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/167,140

(22) Filed: Jun. 11, 2002

(65) Prior Publication Data

US 2002/0148444 A1 Oct. 17, 2002

Related U.S. Application Data

(63) Continuation of application No. 09/562,126, filed on May 1, 2000, now Pat. No. 6,425,375, which is a continuation-in-part of application No. 09/186,852, filed on Nov. 5, 1998, now Pat. No. 6,082,332, which is a continuation-in-part of application No. 09/053,959, filed on Apr. 2, 1998, now Pat. No. 6,065,450, which is a continuation of application No. 08/864,606, filed on May 28, 1997, now Pat. No. 5,738,075, which is a continuation of application No. 08/707,804, filed on Aug. 30, 1996, now Pat. No. 5,687,693, which is a continuation-in-part of application No. 08/668,552, filed on Jun. 21, 1996, now Pat. No. 5,697,342, which is a continuation-in-part of application No. 08/489,660, filed on Jun. 12, 1995, now Pat. No. 5,673,669, which is a continuation of application No. 08/283,232, filed on Jul. 29, 1994, now Pat. No. 5,463,996.

(51) Int. Cl.$^7$ .............................................. F02M 37/04
(52) U.S. Cl. ...................................................... 123/446
(58) Field of Search ................................ 123/446, 447, 123/467

(56) References Cited

U.S. PATENT DOCUMENTS

| | | |
|---|---|---|
| 3,175,771 A | 3/1965 | Breting |
| 3,241,768 A | 3/1966 | Croft |
| 3,361,161 A | 1/1968 | Schwartz |

(List continued on next page.)

FOREIGN PATENT DOCUMENTS

| | | |
|---|---|---|
| DE | 41 18 237 A1 | 12/1991 |
| EP | 0056916 | 8/1982 |

(List continued on next page.)

OTHER PUBLICATIONS

Authors: R.Cihocki, P. Herzog, F. Schweinzer; "Latest Findings in Development of High–Speed Direct Injection (HSDI) Diesel Engines in Passenger Vehicles"; thirty pages, which includes original German publication with Figs.; published Apr. 28, 1994 in Germany.

(List continued on next page.)

*Primary Examiner*—Thomas N. Moulis
(74) *Attorney, Agent, or Firm*—Liell & McNeil (57) ABSTRACT

A hydraulically actuated fuel injector has an injector body including a barrel and defining a nozzle chamber, a needle control chamber, and a nozzle outlet that opens to the nozzle chamber. The injector body further includes an actuation fluid inlet and an actuation fluid drain. A barrel defines an actuation fluid cavity and a piston bore, which includes an upper bore and a lower bore. Fuel is hydraulically pressurized in the nozzle chamber. A piston with a stepped top slides in the piston bore and moves in between a retracted position and an advanced position. A needle valve member in the nozzle chamber moves between an open position and a closed position. The needle valve member includes a closing hydraulic surface exposed to pressure in the needle control chamber. A needle control valve including an actuator is attached to the injector body and moves between an off position in which the needle control chamber is opened to a source of high pressure fluid and an on position in which the needle control chamber is opened to a low pressure passage. An actuation fluid control valve opens and closes the actuation fluid cavity.

1 Claim, 8 Drawing Sheets

U.S. PATENT DOCUMENTS

| | | |
|---|---|---|
| 3,443,760 A | 5/1969 | Simmons |
| 3,450,353 A | 6/1969 | Eckert |
| 3,532,121 A | 10/1970 | Sturman et al. |
| 3,570,806 A | 3/1971 | Sturman et al. |
| 3,570,807 A | 3/1971 | Sturman et al. |
| 3,570,833 A | 3/1971 | Sturman et al. |
| 3,585,547 A | 6/1971 | Sturman et al. |
| 3,592,568 A | 7/1971 | Fenne |
| 3,604,959 A | 9/1971 | Sturman |
| 3,661,130 A | 5/1972 | Eheim |
| 3,683,239 A | 8/1972 | Sturman |
| 3,742,918 A | 7/1973 | Murtin et al. |
| 3,743,898 A | 7/1973 | Murtin et al. |
| 3,821,967 A | 7/1974 | Sturman et al. |
| 3,837,324 A | 9/1974 | Links |
| 3,921,604 A | 11/1975 | Links |
| 3,989,066 A | 11/1976 | Sturman et al. |
| 4,040,569 A | 8/1977 | Knapp |
| 4,064,855 A | 12/1977 | Johnson |
| 4,089,315 A | 5/1978 | Lakra |
| 4,096,995 A | 6/1978 | Klomp |
| 4,107,546 A | 8/1978 | Sturman et al. |
| 4,108,419 A | 8/1978 | Sturman et al. |
| 4,114,647 A | 9/1978 | Sturman et al. |
| 4,120,456 A | 10/1978 | Kimura et al. |
| 4,129,255 A | 12/1978 | Bader, Jr. et al. |
| 4,192,466 A | 3/1980 | Tanasawa et al. |
| 4,258,674 A | 3/1981 | Wolff |
| 4,269,360 A | 5/1981 | Kopse |
| 4,343,280 A | 8/1982 | Luscomb |
| 4,392,612 A | 7/1983 | Deckard et al. |
| 4,409,638 A | 10/1983 | Sturman et al. |
| 4,417,557 A | 11/1983 | Walter |
| 4,440,132 A | 4/1984 | Terada et al. |
| 4,471,740 A | 9/1984 | Jourde et al. |
| 4,482,094 A | 11/1984 | Knape |
| 4,498,625 A | 2/1985 | Schechter |
| 4,501,290 A | 2/1985 | Sturman et al. |
| 4,516,600 A | 5/1985 | Sturman et al. |
| 4,541,454 A | 9/1985 | Sturman et al. |
| 4,544,096 A | 10/1985 | Burnett |
| 4,561,701 A | 12/1985 | Fujii et al. |
| 4,568,021 A | 2/1986 | Deckard et al. |
| 4,580,598 A | 4/1986 | Itoh |
| 4,586,656 A | 5/1986 | Wich |
| 4,603,671 A | 8/1986 | Yoshinaga et al. |
| 4,618,095 A | 10/1986 | Spoolstra |
| 4,628,881 A | 12/1986 | Beck et al. |
| 4,635,854 A | 1/1987 | Ishibashi |
| 4,671,232 A | 6/1987 | Stumpp et al. |
| 4,681,080 A | 7/1987 | Schukoff |
| 4,709,679 A | 12/1987 | Djordjevic et al. |
| 4,714,066 A | 12/1987 | Jordan |
| 4,721,253 A | 1/1988 | Noguchi et al. |
| 4,777,921 A | 10/1988 | Miyaki et al. |
| 4,782,807 A | 11/1988 | Takahashi |
| 4,811,221 A | 3/1989 | Sturman et al. |
| 4,813,601 A | 3/1989 | Schwerdt et al. |
| 4,823,588 A | 4/1989 | Bussereau et al. |
| 4,831,989 A | 5/1989 | Haines |
| 4,838,232 A | 6/1989 | Wich |
| 4,840,160 A | 6/1989 | Zipprath et al. |
| 4,870,940 A | 10/1989 | Filippi et al. |
| 4,934,599 A | 6/1990 | Hasagawa |
| RE33,270 E | 7/1990 | Beck et al. |
| 4,946,103 A | 8/1990 | Ganser |
| 4,951,631 A | 8/1990 | Eckert |
| 4,951,874 A | 8/1990 | Ohnishi et al. |
| 4,957,085 A | 9/1990 | Sverdlin |
| 4,964,571 A | 10/1990 | Taue et al. |
| 4,969,600 A | 11/1990 | Nicol |
| 4,993,637 A | 2/1991 | Kanesaka |
| 5,007,584 A | 4/1991 | Rossignol |
| 5,033,442 A | 7/1991 | Perr et al. |
| 5,046,472 A | 9/1991 | Linder |
| 5,072,882 A | 12/1991 | Taue et al. |
| 5,082,180 A | 1/1992 | Kubo et al. |
| 5,094,215 A | 3/1992 | Gustafson |
| 5,109,822 A | 5/1992 | Martin |
| 5,121,730 A | 6/1992 | Ausman et al. |
| 5,133,645 A | 7/1992 | Crowley et al. |
| 5,141,164 A | 8/1992 | Ohno et al. |
| 5,143,291 A | 9/1992 | Grinsteiner |
| 5,155,461 A | 10/1992 | Teerman et al. |
| 5,201,295 A | 4/1993 | Kimberley et al. |
| 5,221,046 A | 6/1993 | Timmer |
| 5,230,613 A | 7/1993 | Hilsbos et al. |
| 5,235,954 A | 8/1993 | Sverdlin |
| 5,265,804 A | 11/1993 | Brunel |
| 5,271,563 A | 12/1993 | Cerny et al. |
| 5,295,469 A | 3/1994 | Kariya et al. |
| 5,335,852 A | 8/1994 | Muntean et al. |
| 5,347,970 A | 9/1994 | Pape et al. |
| 5,353,991 A | 10/1994 | De Nagel et al. |
| 5,370,095 A | 12/1994 | Yamaguchi et al. |
| 5,413,076 A | 5/1995 | Koenigswieser et al. |
| 5,441,028 A | 8/1995 | Felhofer |
| 5,460,329 A | 10/1995 | Sturman et al. |
| 5,477,828 A | 12/1995 | Barnes |
| 5,485,820 A | 1/1996 | Iwaszkiewicz |
| 5,485,957 A | 1/1996 | Sturman |
| 5,526,791 A | 6/1996 | Timmer et al. |
| 5,622,152 A | 4/1997 | Ishida |
| 5,682,858 A | 11/1997 | Chen et al. |
| 5,687,693 A | 11/1997 | Chen et al. |
| 5,720,261 A | 2/1998 | Sturman |
| 5,738,075 A | 4/1998 | Chen et al. |
| 5,826,562 A | 10/1998 | Chen et al. |
| 5,833,146 A | 11/1998 | Hefler |
| 6,024,296 A | 2/2000 | Wear et al. |

FOREIGN PATENT DOCUMENTS

| | | |
|---|---|---|
| EP | 0 691 471 A1 | 1/1996 |
| EP | 0 828 073 A2 | 3/1998 |
| JP | 60 162022 | 8/1985 |

OTHER PUBLICATIONS

Authors: K. Prescher, W. Bauer, W. Schaffitz; "Common Rail Injection Systems With Characteristics Independent of Engine Speed And With High Injection Pressure—Diesel Engine Potential For the Future"; thirty–nine pages, which includes original German publication with Figs.; published Apr. 28, 1994 in Germany.

Authors: K. Egger, P. Reisenbichler, R. Leonhard; "Common Rail Injection Systems For Diesel Engines Analysis, Potential, Future"; twenty–eight pages, which includes original German publication with Figs.; published Apr. 28, 1994 in Germany.

Author: A. Dolenc; "The Injection Equipment of Future High–Speed DI Diesel Engines With Respect To Power And Pollution Requirements"; ten pages; published Feb. 7, 1990 in Great Britain.

Authors: T.C. Tow, D.A. Pierpont, R.D. Reitz; "Reducing Participate and NOx Emissions By Using Multiple Injections In A Heavy Duty D.I. Diesel Engine"; seventeen pages; published Feb. 27, 1984 in the United States.

Authors: N. John Beck, Robert L. Barkhimer, Michael A. Calkins, William P. Johnson, William E. Weseloh; "Direct Digital Control of Electronic Unit Injectors"; twelve pages; published Feb. 26, 1990 in the United States.

Authors: N. John Beck, S.K. Chen; "Injection Rate Shaping and High Speed Combustion Analysis—New Tools For Diesel Engine Combustion Development"; twenty pages; published Feb. 26, 1990 in the United States.

Authors: R. Racine, M. Miettaux, Y. Drutel, J. Heidt; "Application of a High Flexible Electronic Injection System To a Heavy Duty Diesel Engine"; fourteen pages; published Feb. 25, 1991 in the United States.

Authors: M. Miyaki, H. Fujisawa, A. Masuda, Y. Yamamoto; "Development of New Electronically Controlled Fuel Injection System ECD–U2 For Diesel Engines"; seventeen pages; believed to have been published in 1991.

Author: BKM, Inc.; "Servo Jet Electronic Fuel Injection HSV High Speed Solenoid Valves"; four pages; published 1985 in the United States.

Author: T.C. Tow; "The Effect of Multiple Pulse Injection, Injection Rate and Injection Pressure On Particulate and NOx Emissions From A D.I. Diesel Engine"; one hundred forty–seven pages; published in 1993 in the United States.

Fig. 1

Fig_2_

Fig_4a_

Fig_4b_

Fig_4c_

Fig_4d_

Fig_5_

Fig_6_

Fig_7a_

Fig_7b_

Fig_8_

Fig_9_

Fig_10

PISTON AND BARREL ASSEMBLY WITH STEPPED TOP AND HYDRAULICALLY-ACTUATED FUEL INJECTOR UTILIZING SAME

RELATION TO OTHER PATENT APPLICATIONS

This application is a continuation of Ser. No. 09/562,126, filed May 1, 2000, now U.S. Pat. No. 6,425,375, which is a continuation-in-part of application Ser. No. 09/186,852, filed Nov. 5, 1998, now U.S. Pat. No. 6,082,332, which was a continuation-in-part of co-pending application Ser. No. 09/053,959 filed Apr. 2, 1998 and entitled HYDRAULICALLY-ACTUATED FUEL INJECTOR WITH DIRECT CONTROL NEEDLE VALVE, now U.S. Pat. No. 6,065,450, which was a continuation of application Ser. No. 08/864,606, filed May 28, 1997, also entitled HYDRAULICALLY-ACTUATED FUEL INJECTOR WITH DIRECT CONTROL NEEDLE VALVE, now U.S. Pat. No. 5,738,075, which was a continuation of application Ser. No. 08/707,804 filed Aug. 30, 1996, also entitled HYDRAULICALLY-ACTUATED FUEL INJECTOR WITH DIRECT CONTROL NEEDLE VALVE, now U.S. Pat. No. 5,687,693, which was a continuation-in-part of application Ser. No. 08/668,552 filed Jun. 21, 1996, also entitled HYDRAULICALLY-ACTUATED FUEL INJECTOR WITH DIRECT CONTROL NEEDLE VALVE, now U.S. Pat. No. 5,697,342 which was a continuation-in-part of application Ser. No. 08/489,660 filed Jun. 12, 1995 and entitled HYDRAULICALLY-ACTUATED FUEL INJECTOR HAVING PREINJECTION PRESSURIZABLE FLUID AND DIRECT-OPERATED CHECK, now U.S. Pat. No. 5,673,669, which was a continuation of application Ser. No. 08/283,232, filed Jul. 29, 1994 with the same title, now U.S. Pat. No. 5,463,996.

TECHNICAL FIELD

The present invention relates generally to hydraulically driven piston and barrel assemblies, and more particularly hydraulically-actuated fuel injectors utilizing stepped piston and barrel assemblies.

BACKGROUND ART

Hydraulically driven piston and barrel assemblies are utilized in diverse ways in a wide variety of related and unrelated machines. In most of these applications, the piston reciprocates in a piston bore defined by the barrel between a retracted position and an advanced position. The piston is driven from its retracted position toward its advanced position by a hydraulic pressure force produced by a pressurized fluid acting on one end of the piston. In some instances, it is desirable to control the initial movement rate of the piston. For example, piston and barrel assemblies are utilized in hydraulically-actuated fuel injectors to pressurize fuel within the injector for each injection event. Over time, engineers have discovered that the injection rate profile can be controlled by controlling the movement rate of the piston. Controlling the initial injection rate is especially important because of the strong influence that initial injection rate shape has on the quality of emissions leaving a particular engine.

Known hydraulically-actuated fuel injection systems and/or components are shown, for example, in U.S. Pat. No. 5,121,730 issued to Ausman et al. on Jun. 16, 1992; U.S. Pat. No. 5,271,371 issued to Meints et al. on Dec. 21, 1993; and, U.S. Pat. No. 5,297,523 issued to Hafner et al. on Mar. 29, 1994. In these hydraulically-actuated fuel injectors, a spring biased needle check opens to commence fuel injection when pressure is raised by an intensifier piston/plunger assembly to a valve opening pressure. The intensifier piston is acted upon by a relatively high pressure actuation fluid, such as engine lubricating oil, when an actuator driven actuation fluid control valve opens the injector's high pressure inlet. In these hydraulically actuated fuel injectors, the actuator comprises a solenoid. Injection is ended by deactivating the solenoid to release pressure above the intensifier piston. This in turn causes a drop in fuel pressure causing the needle check to close under the action of its return spring and end injection.

While these hydraulically-actuated fuel injectors have performed magnificently over many years, there remains room for improvement, especially in the area of shaping an injection rate trace from beginning to end to precisely suit a set of engine operating conditions.

Over the years, engineers have discovered that engine emissions can be significantly reduced at certain operating conditions by providing a particular injection rate trace. In many cases, emissions are improved when the initial injection rate is controllable, and when there is a nearly vertical abrupt end to injection. While these prior hydraulically-actuated fuel injection systems have some ability to control the injection rate shape, there remains room to improve the ability to control the injection rate shape with hydraulically-actuated fuel injection systems.

The invention is directed to overcoming one or more of the problems set forth above.

DISCLOSURE OF THE INVENTION

A hydraulically actuated fuel injector has an injector body that includes a barrel and defines a nozzle chamber, a needle control chamber and a nozzle outlet that opens to the nozzle chamber. The injector body further includes an actuation fluid inlet and an actuation fluid drain. A barrel defines an actuation fluid cavity and a piston bore, which includes an upper bore and a lower bore. Hydraulic means are included within the injector body for pressurizing fuel in the nozzle chamber. The hydraulic means includes a piston with a stepped top slidably received in the piston bore and moveable between a retracted position and an advanced position. The stepped top of the piston includes a first area that is separate from a second area. The first area and the upper bore define an upper cavity connected to the actuation fluid cavity through a relatively unrestricted flow area when the piston is in the retracted position. The second area and the lower bore define a lower cavity connected to the actuation fluid cavity through a relatively restricted flow area when the piston is in the retracted position. The first area is exposed to fluid pressure in the upper cavity and the second area is exposed to fluid pressure in the lower cavity over a portion of the piston's movement from the retracted position toward the advanced position. A needle valve member is positioned in the nozzle chamber and is moveable between an open position in which the nozzle outlet is open and a closed position in which the nozzle outlet is blocked. The needle valve member includes a closing hydraulic surface exposed to pressure in the needle control chamber. A needle control valve includes an actuator and is attached to the injector body and is moveable between an off position in which the needle control chamber is opened to a source of high pressure fluid and an on position in which the needle control chamber is opened to a low pressure passage. An actuation fluid control valve includes the actuator and is moveable between a first position in which the actuation fluid inlet is open to the actuation fluid cavity and a second position in which the actuation fluid inlet is closed to the actuation fluid cavity.

BRIEF DESCRIPTION OF THE DRAWINGS

FIG. 7b is a top elevational view of the inner portion of the stepped piston shown in FIG. 7a.

BEST MODE FOR CARRYING OUT THE INVENTION

Figure 1:
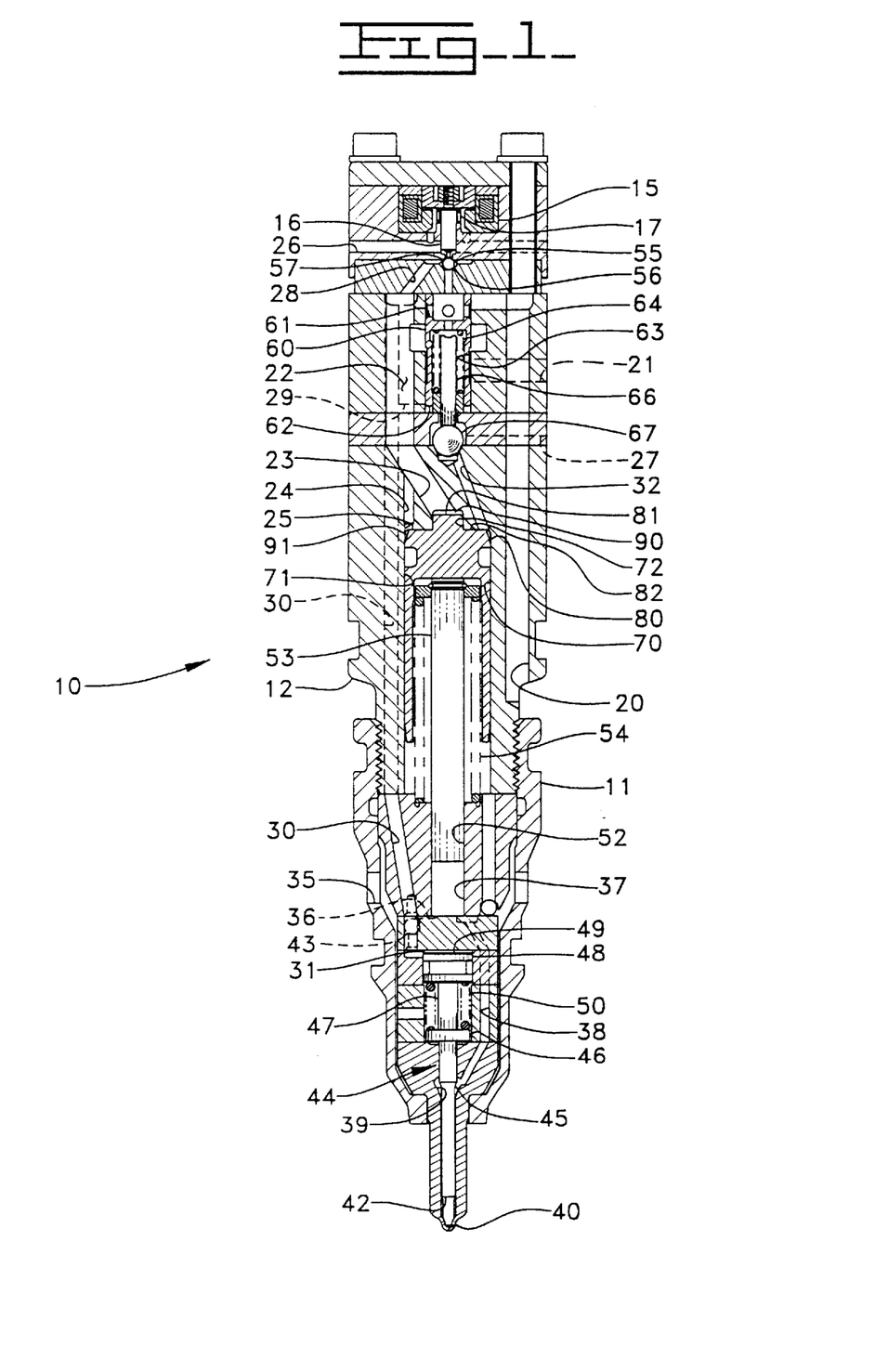
FIG. 1 is a sectioned side elevational view of a hydraulically-actuated fuel injector according to the present invention utilizing a solenoid actuator.

Referring now to FIG. 1, a hydraulically-actuated fuel injector 10 utilizes a single solenoid 15 to control both the flow of high pressure actuation fluid into the injector and the flow of high pressure fuel out of the injector. Injector 10 includes an injector body 11 made up of various components attached together in a manner known in the art. The injector includes a hydraulic means for pressurizing fuel that includes an actuation fluid control valve that alternately opens actuation fluid cavity 22 to the high pressure of actuation fluid inlet 20 or the low pressure of actuation fluid drain 21. The actuation fluid control valve includes two-way solenoid 15, which is attached to a pin 16 and biased toward a retracted position by a spring 17. The actuation fluid control valve also includes a ball valve member 55, and a spool valve member 60. Ball valve member 55 is positioned between a high pressure seat 56 and a low pressure seat 57. When solenoid 15 is deactivated, high pressure actuation fluid acting on ball valve member 55 holds the same in low pressure seat 57 to close actuation fluid drain 26. When solenoid 15 is activated, pin 16 moves downward contacting ball valve member 55 and pushing it downward to close high pressure seat 56 and open low pressure seat 57.

Spool valve member 60 reciprocates in a spool bore between a first position (as shown) in which actuation fluid cavity 22 is open to low pressure actuation fluid drain 21, and a second lower position in which drain 21 is closed but actuation fluid cavity 22 is open to high pressure actuation fluid inlet 20 via radial openings 61 in the spool valve member. Spool valve member 60 is biased toward its first position by a compression spring 64. When solenoid 15 is energized to push ball valve member 55 to close high pressure seat 56 and open low pressure seat 57, spool hydraulic surface 62 becomes exposed to the low pressure in drain 26 via spool control passage 29 and control passage 28. When this occurs, spool valve member 60 becomes hydraulically imbalanced and moves downward toward its second position against the action of biasing spring 64.

The hydraulic means for pressurizing fuel further includes a stepped piston 80 which is slidably received in a piston bore 70 and moveable between a retracted position (as shown) and an advanced position. A plunger 53 is in contact with the underside of piston 80 and is slidably positioned in a plunger bore 52. Plunger 53 and stepped piston 80 are biased toward their retracted position by a return spring 54. Finally, a portion of plunger bore 52 and plunger 53 define a fuel pressurization chamber 37 in which fuel is pressurized to injection pressure when piston 80 and plunger 53 undergo their downward stroke.

Fuel enters injector 10 through a fuel inlet 35 and travels upward through fuel supply passage 36 past ball check 43 and into fuel pressurization chamber 37 when plunger 53 and piston 80 are undergoing their return stroke. Ball check 43 prevents the back flow of fuel when plunger 53 is undergoing its downward pumping stroke during an injection event.

Fuel pressurization chamber 37 communicates with nozzle chamber 39 via a nozzle supply passage 38. Nozzle chamber 39 opens to nozzle outlet 40. A needle valve member 44 is positioned in nozzle chamber 39 and moveable between an open position in which nozzle outlet 40 is open and a closed position in which the nozzle outlet is blocked to nozzle chamber 39. Needle valve member is actually an assembly of component parts including a needle 45, a disk spacer 46, a pin spacer 47 and a needle piston 48. Needle piston 48 includes a closing hydraulic surface 49 exposed to fluid pressure in a needle control chamber 31. Needle control chamber 31 communicates with control passage 28 via a needle control passage 30. When solenoid 15 is deactivated, closing hydraulic surface 49 of needle valve member 44 is exposed to the high pressure of actuation fluid inlet 20 via needle control passage 30, control passage 28, past high pressure seat 56 and through radial openings 61 in spool valve member 60. When solenoid 15 is energized to close high pressure seat 56, needle control chamber 31 is exposed to the low pressure of drain 26 via needle control passage 30, control passage 28 and past low pressure seat 57. This aspect of the invention provides direct control over needle valve member 44. In other words, needle valve member 44 can be held in its closed position by exposing closing hydraulic surface 49 to the high pressure of actuation fluid inlet. Needle valve member can only move to its open position when closing hydraulic surface 49 is exposed to the low pressure of drain 26. And then, needle valve member 44 can only open when fuel pressure within nozzle chamber 39 acting on lifting hydraulic surface 42 is sufficient to overcome the action of biasing spring 50. This direct control aspect of the invention allows for split injections and an abrupt end to injection as more thoroughly discussed and described in the parent application identified above.

In order to prevent secondary injections and vent fluid pressure from actuation fluid cavity 22 and piston bore 70 toward the end of an injection event, injector body 11 also defines a pressure relief passage 32 that opens to a third drain 27. A relief ball 67 is held in place to close relief passage 32 during an injection event by the downward force provided by spool valve member 60 as transmitted through pin 66. At the end of an injection event, solenoid 15 is deactivated to reopen high pressure seat 56. This resumes high pressure actuation fluid on spool hydraulic surface 62 causing it to move upward. At the same time, residual hydraulic actuation fluid pressure acting on relief ball 67 opens relief passage 32 to low pressure drain 27. At the same time, the movement of relief ball 67 provides a boost to hasten the movement of spool valve member 60 in its upward travel via the contact between the two by pin 66. This feature of the invention prevents secondary injections which might otherwise occur due to pressure spikes created within the injector when the needle valve member is abruptly closed at the end of an injection event.

Figure 10:
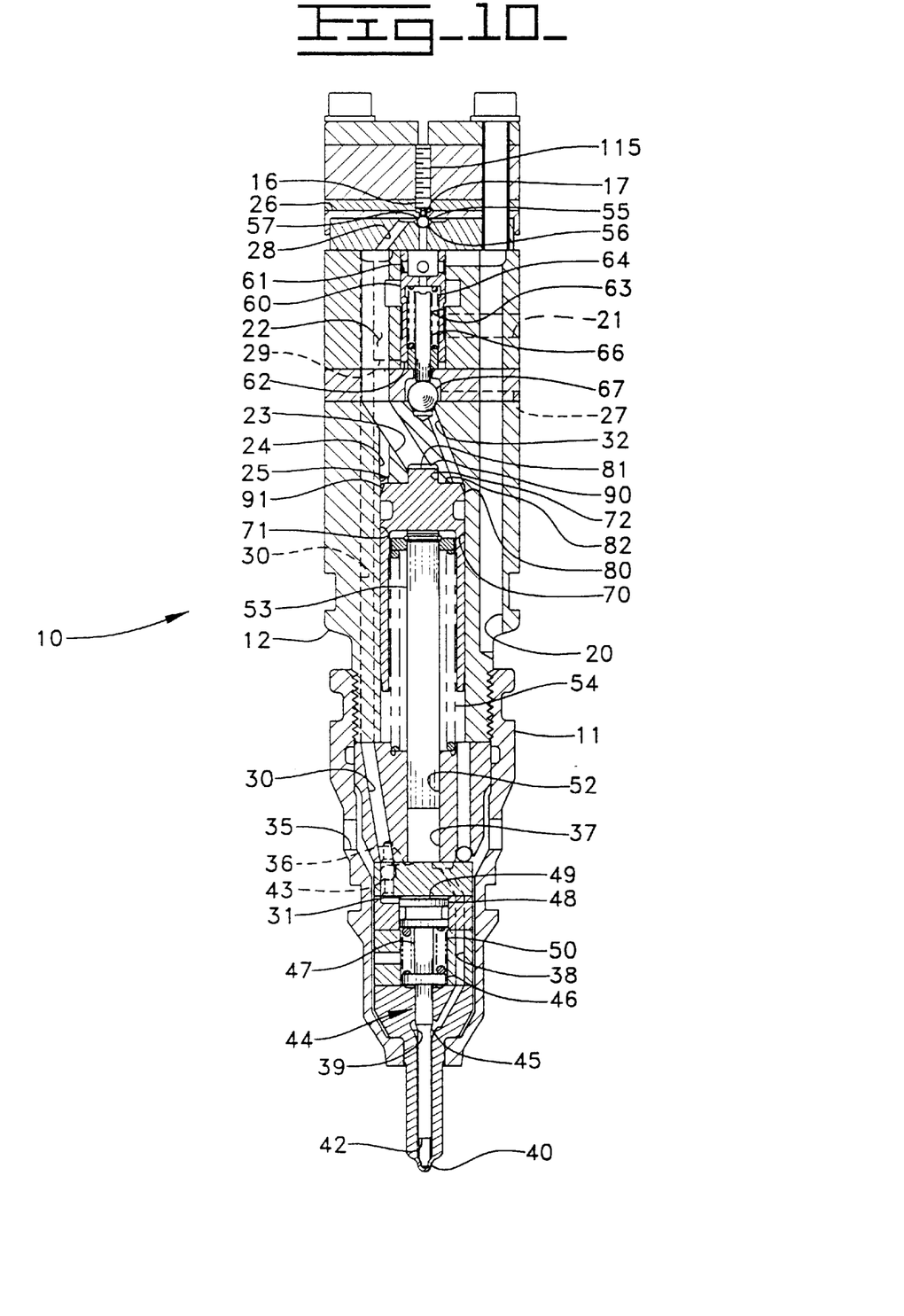
FIG. 10 is a sectioned side elevational view of a hydraulically-actuated fuel injector according to the present invention utilizing a piezo stack actuator.

In other possible embodiments, a piezo stack actuator may also be used, for example as shown in FIG. 10. It will be understood that in such embodiments, operation will occur as described above with reference to FIG. 1, except that instead of energizing or activating the solenoid 15, the piezo stack 115 will be activated. Otherwise, operation of the fuel injector will be essentially the same.

Figure 2:
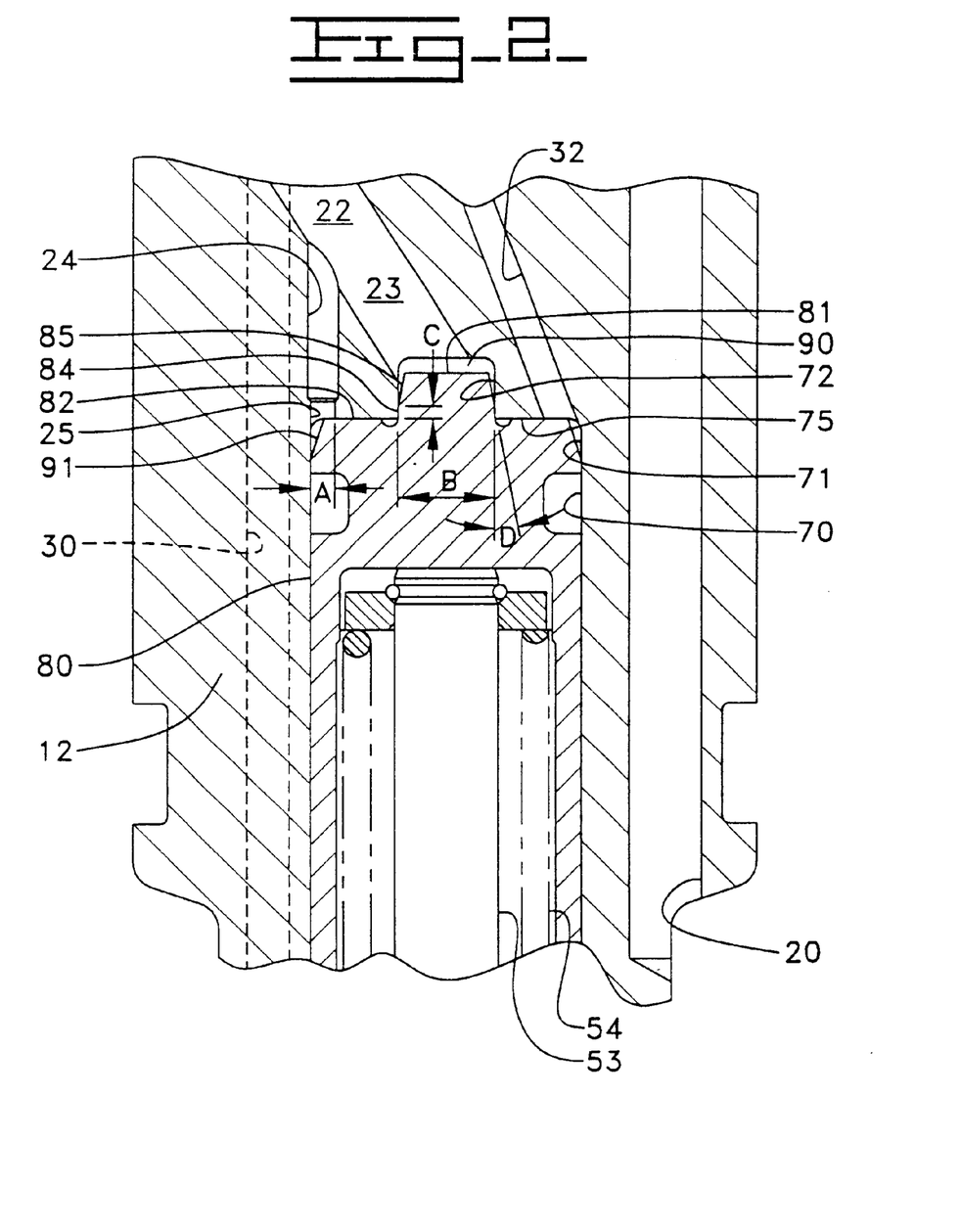
FIG. 2 is a partial sectioned side elevational view of the piston area portion of the fuel injector shown in FIG. 1.

Referring now to FIG. 2, the area in and around the stepped top of piston 80 is illustrated. Piston bore 70 includes an upper bore 72 and a larger diameter lower bore 71. The stepped top of piston 80 includes a first area 81 that is separated from a second area 82 by a regular cylindrical portion 84. First area 81 and upper bore 72 define an upper cavity 90 that is connected to actuation fluid cavity 22 through a relatively unrestricted flow area 23 when piston 80 is in its retracted position, as shown. Second area 82 and lower bore 71 define a lower cavity 91 that is connected to the actuation fluid cavity 22 via a restricted passage 24 that includes a restricted flow area 25, when the piston is in its retracted position. When the piston begins its movement from its retracted position toward its advanced position, the first area 81 is exposed to the full fluid pressure in upper cavity 90, whereas second area 82 is exposed to the fluid pressure in lower cavity 91. Because of the rate at which the volume above second area 82 grows as the piston 80 moves in its downward stroke, the restricted flow area 25 prevents second area 82 from experiencing the full fluid pressure in actuation fluid cavity 22 until the piston moves a sufficient distance downward that fluid can also flow around annular taper 85 onto second area 82. In this embodiment, restricted passage 24 is defined by barrel 12.

Figure 3A:
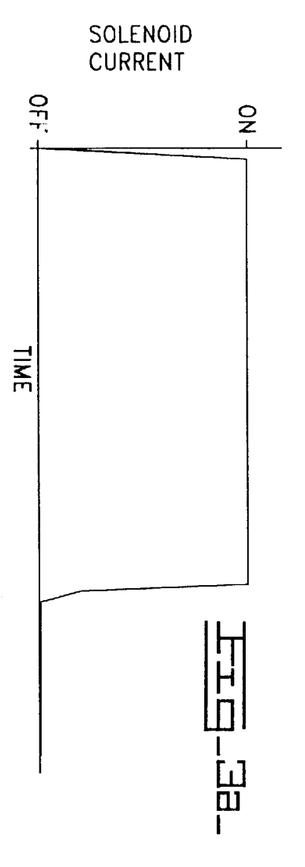
FIGS. 3a–3d are a group of curves showing component positions and injection parameters versus time over a single "boot shaped-square" injection event.
Figure 3B:
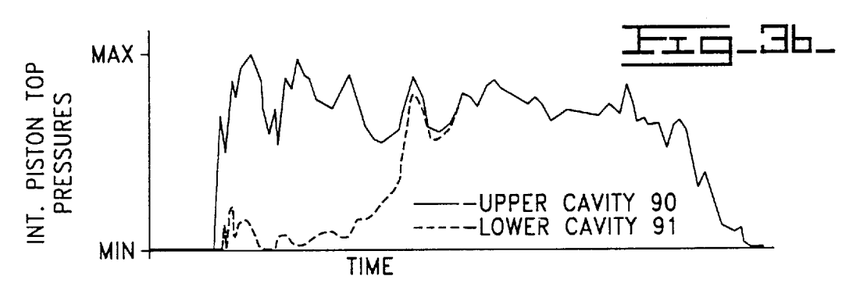
Figure 3C:
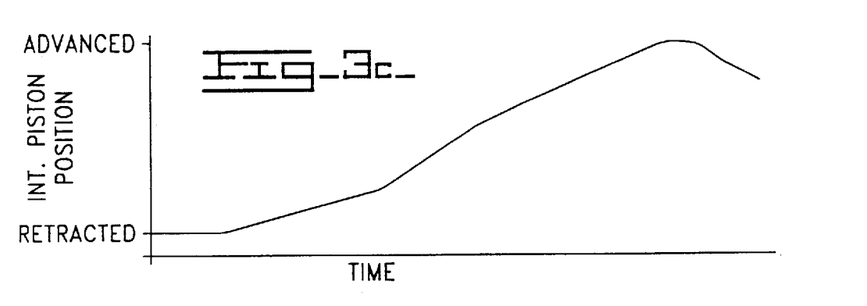
Figure 3D:
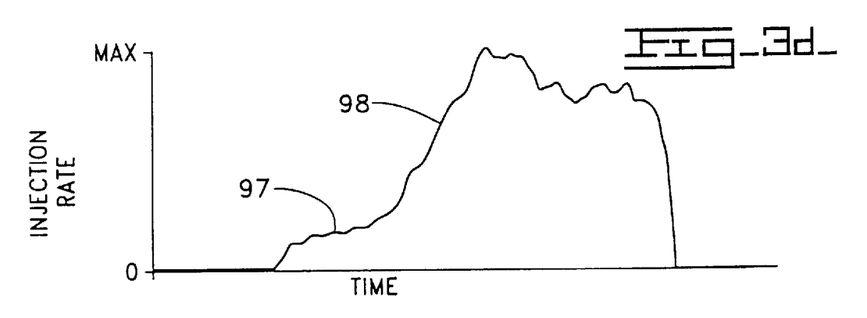

Also shown in FIG. 2 are the design parameters "A", "B", "C", and "D". The height of annular taper 85 is preferably chosen to be sufficiently long that the movement rate of the piston is not influenced by the height of the annular taper. This eliminates one possible area of variability when injectors of this type are mass produced. Control over the design parameters A, B, C and D gives one substantial control over the initial movement rate of piston 80, and hence the initial injection rate profile from the injector. The hole diameter "A", which defines a restrictive flow area, and the diameter "B" and the height "C" of the regular cylindrical portion can be sized such that when the regular cylindrical portion 84 is still in upper bore 72, the fluid pressure in lower cavity 91 can be made to be essentially constant as shown in FIG. 3b. Thus, the height of regular cylindrical portion 84 controls the duration of the "flat portion" 97 of the boot injection profile illustrated in FIG. 3d. As the piston 80 continues its downward movement, the regular cylindrical portion 84 moves out of upper bore 72 to open an annular gap between annular taper 84 and upper bore 72. This allows actuation fluid to flow into lower cavity 91 both through restricted passage 24 and past annular taper 85 so that pressure in lower cavity 91 begins to rise. As a result, fuel pressure increases, producing the ramp up portion 98 shown in FIG. 3d. The slope "D" of annular taper 85 controls the slope of the ramp up portion 98.

Figure 4A:
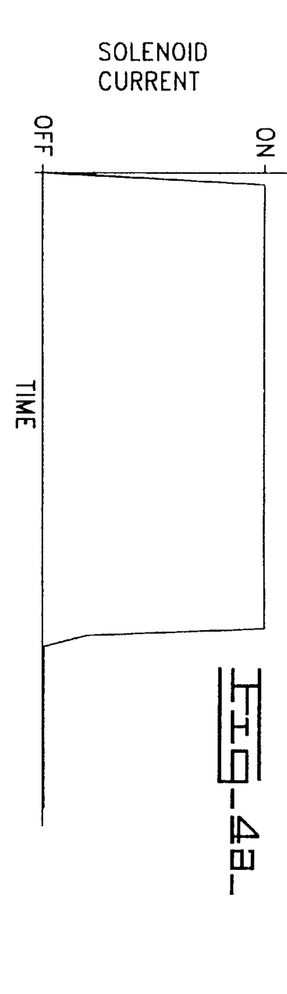
FIGS. 4a–4d are a group of curves showing component positions and injection parameters versus time over a single "ramp-square" injection event.
Figure 4B:
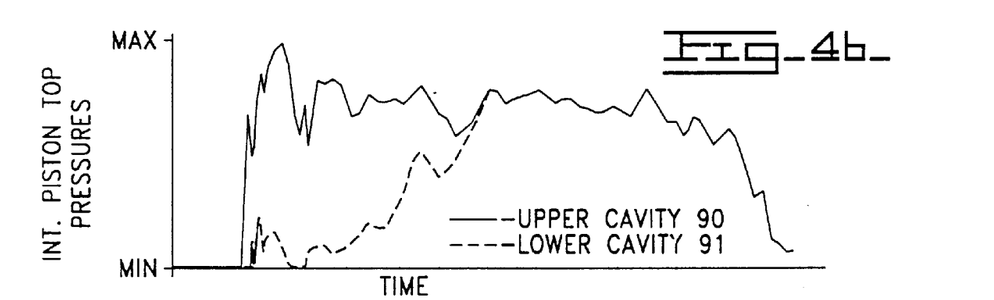
Figure 4C:
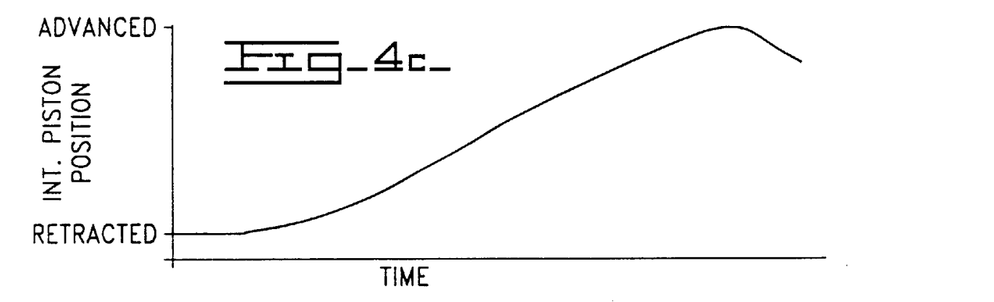
Figure 4D:
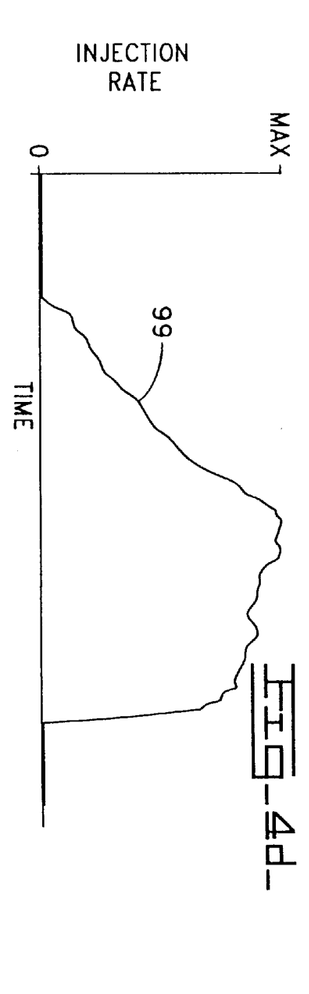

The height "C" of regular cylindrical portion 84 controls the duration of the initial flat portion 98 of the boot injection. If dimension "C" is short enough, the initial flat portion would disappear, resulting in a ramp up only portion 99 as illustrated in FIG. 4d. Still, dimension "C" preferably has some minimal lead distance length because some movement of the piston is typically necessary to compress the fuel below plunger 53 to a satisfactory injection pressure. Thus, by varying dimensions "A", "B", "C", and "D", the present invention provides near total flexibility in controlling the front portion of the injection rate trace, which is very important in controlling engine emissions.

Figure 5:
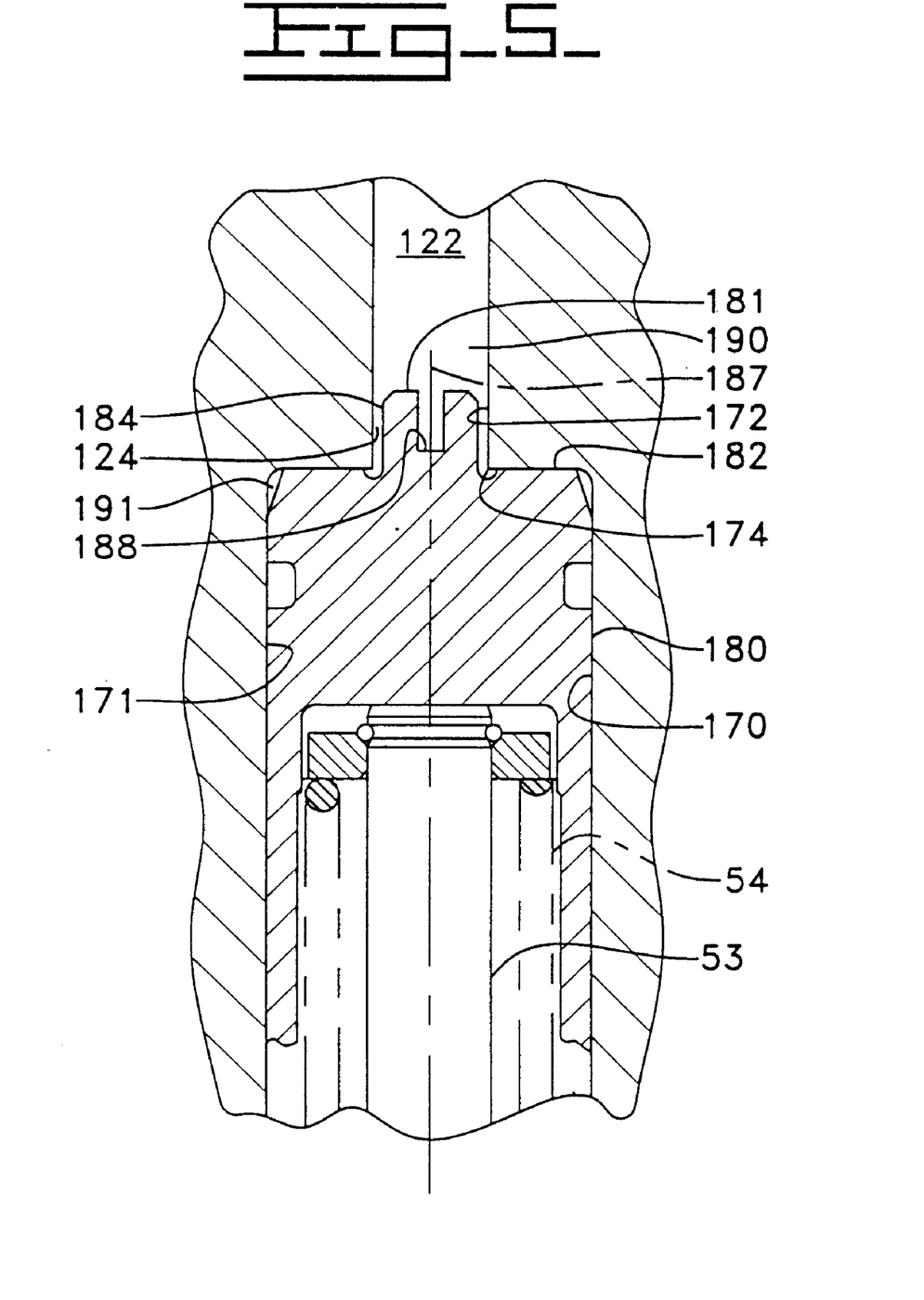
FIG. 5 is a partial sectioned side elevational view of a piston and barrel assembly according to another embodiment of the present invention.

Referring now to FIG. 5, an alternative embodiment of the present invention is shown which includes a piston 180 with a stepped top slidably received in a piston bore 170, which includes a lower bore 171 and an upper bore 172. Like the earlier embodiment, stepped piston 180 includes a first area 181 that is separated from a second area 182 by a regular cylindrical portion 184. Stepped piston 180 sits atop a plunger 53 and a return spring 54, which are identical to the embodiment previously described.

Like the previous embodiment, the first area 181 and upper bore 172 define an upper cavity 190 that is connected to an actuation fluid cavity 122 through a relatively unrestricted flow area. The second area 182 and the lower bore 171 define a lower cavity connected to actuation fluid cavity 122 through a relatively restricted flow passage 124 defined by the area between regular cylindrical portion 184 and upper bore 172. This version performs substantially similar to the earlier version but instead of the barrel defining a separate restricted passageway, the piston and barrel define restricted passage 124. Also, this embodiment is different in that instead of an annular taper on the upper stepped portion of the piston, a slot 187 is machined therein. In this case, the width of slot 187 is the counterpart to the slope "D" shown in FIG. 2. In other words, the wider the slot, the steeper the ramp up portion of the injection profile. In this embodiment, the difference in the height of the upper step portion from the depth of the slot corresponds to the dimension "C" shown in FIG. 2. In other words, the deeper the slot the less a flat portion 97 (FIG. 3d) will appear in the injection rate profile.

Figure 6:
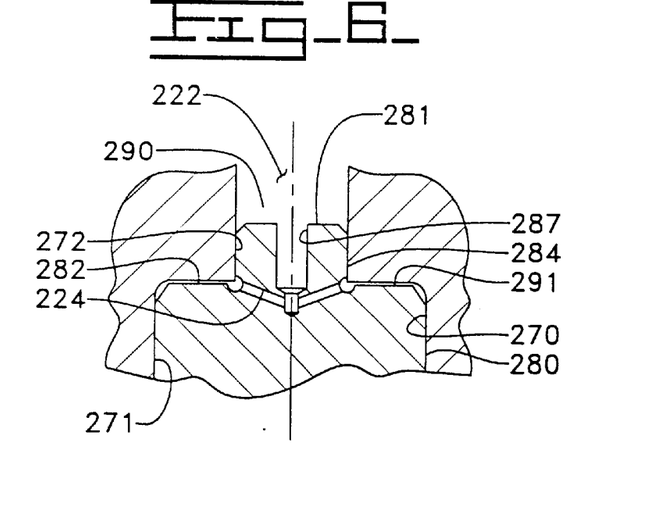
FIG. 6 is a partial sectioned side elevational view of still another piston and barrel assembly according to the present invention.

Referring now to FIG. 6, still another embodiment of the present invention is shown in which the piston itself defines the restricted passage to 224. Like the previous embodiments a stepped piston 280 is slidably received in a piston bore 270, which includes a lower bore 271 and an upper bore 272. A first area 281 is separated from a second area 282 by a regular cylindrical portion 284. The first area 281 and upper bore 272 define an upper cavity 290 that is open to the actuation fluid cavity 222 via a relatively unrestricted flow area. Like the previous embodiments, the second area 282 and the lower bore 271 define a lower cavity 291 that is connected to actuation fluid cavity 222 via a restricted passage 224. Like the embodiment shown in FIG. 2, regular cylindrical portion 284 substantially isolates the lower cavity from the upper cavity. This embodiment of the invention operates substantially identical to the earlier embodiments described, but just contains different geometry to accomplish the same purposes.

Figure 7A:
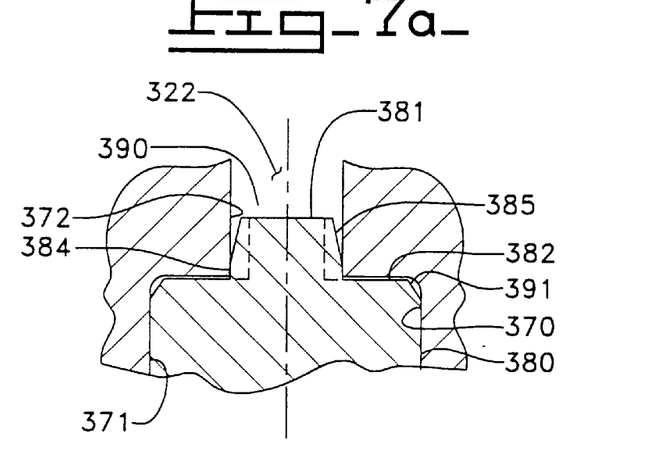
FIG. 7a is a partial sectioned side elevational view of another piston and barrel assembly according to the present invention.
Figure 7B:
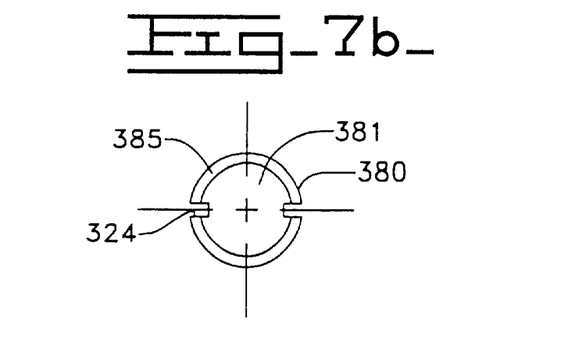

Referring now to FIG. 7a, still another embodiment is shown in which a stepped plunger 380 is slidably received and a piston bore 370 that includes a lower bore 371 and an upper bore 372. A first area 381 and the upper bore 372 define an upper cavity, as in the previous embodiments. Likewise, a second area 382 and lower bore 371 define a lower cavity that is connected to actuation fluid cavity 322 via a restricted passage 324, which in this embodiment is created by slots cut into annular taper 385. Thus, in this embodiment like the embodiment shown in FIG. 5, the piston and plunger define the restricted passage 324. However, this embodiment is like the embodiment shown in FIG. 1 in that it includes a regular cylindrical portion 384 and an annular taper portion 385.

Figure 8:
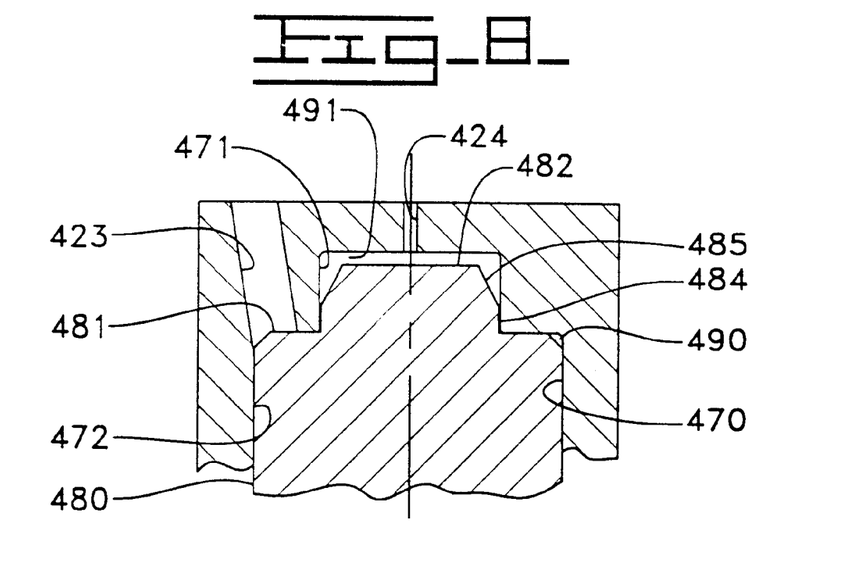
FIG. 8 is a partial sectioned side elevational view of a piston and barrel assembly according to another embodiment of the present invention.

Referring now to FIG. 8, another embodiment of the present invention is shown that behaves identical to the previous embodiments but includes different geometry. In this case, the second area 482 is located inside of the first area 481. Like the previous embodiments, a restricted passage 424 opens into a first cavity 491. A relatively unrestricted flow area 423 opens to a second cavity 490. Like the previous embodiments, a stepped piston 480 is slidably received in a piston bore 470 that includes an upper bore 471 and a lower bore 472. Also like the embodiment shown in FIG. 2, the stepped piston includes a regular cylindrical portion 484 and an annular taper 485.

Figure 9:
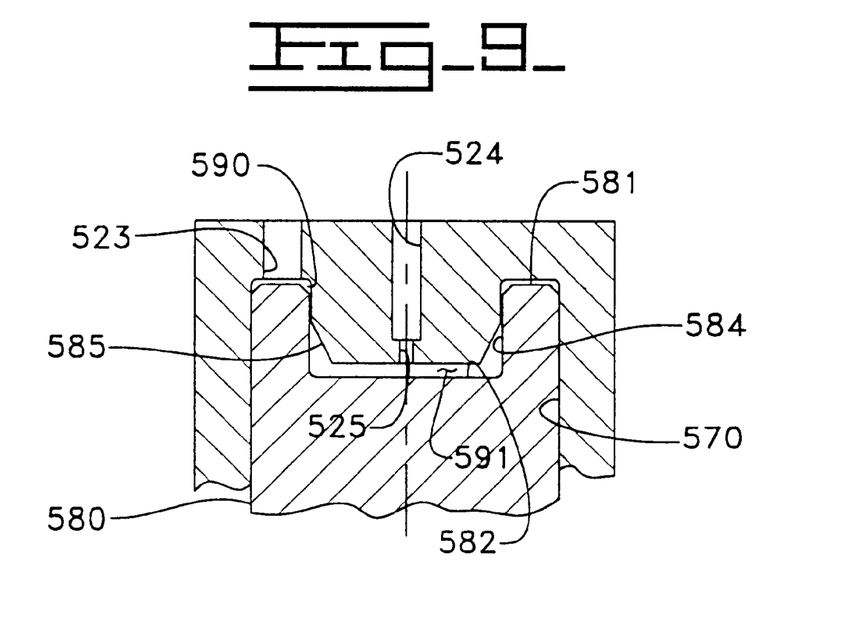
FIG. 9 is a partial sectioned side elevational view of still another piston and barrel assembly according to the present invention.

FIG. 9 shows another embodiment of the present invention in which still another geometrical variation of the present invention is shown. In particular, a stepped piston 580 is slidably received in a piston bore 570. The first area 581 is separated from a second area 582 by a regular cylindrical portion 584. Like the previous embodiments, a first cavity 591 is connected to an actuation fluid cavity (not shown) through a restricted passage 524 that includes a restricted flow area 525. Also like the previous embodiment, a second cavity 590, which acts upon first area 581, is connected to an actuation fluid cavity via an unrestricted flow area 523.

INDUSTRIAL APPLICABILITY

The present invention finds potential application to any piston and barrel assembly that is hydraulically driven and in which it is desirable to slow the initial movement rate of the piston. This slowing of the initial movement rate of the piston is accomplished by machining various geometrical relationships between the piston and the piston bore rather than through control of the pressure of the fluid acting on the piston as a whole. The present invention finds special application in the case of hydraulically-actuated fuel injectors in which it is desirable to slow the initial movement rate of the piston in order to provide a more desirable front end injection rate trace to reduce undesirable engine emissions.

While any of the embodiments illustrated could be utilized in a fuel injector, the embodiment shown in FIGS. 1 and 2 is most desired because of the ease with which circular features can be machined in a bore or on a cylindrical piston to relatively tight tolerances. In other words, the slots illustrated in some of the embodiments could prove more difficult to reliably manufacture is mass quantities while maintaining the tight dimension tolerances necessary to produce consistent results.

In any event, the above description is intended for illustrative purposes only and is not intended to limit the scope of the present invention in any way. In other words, the various geometrically shaped piston and barrel assemblies illustrated above are not intended as an exhaustive presentation of examples which would fall within the scope of the present invention. Those skilled in the art will appreciate that other piston and barrel assembly geometries, which are not shown, will fall within the scope of the present invention. Other aspects, objects, and advantages of this invention can be obtained from a study of the drawings, the disclosure, and the appended claims.

We claim:

1. A fuel injector comprising:

an actuation fluid control valve including a hollow spool valve member movable between a first position and a second position;

an intensifier piston;

a direct control needle valve member with a closing hydraulic surface exposed to fluid pressure in a needle control chamber; and a direct control needle valve member movable between a first position that fluidly connects said needle control chamber to a high pressure passage, and a second position that fluidly connects said needle control chamber to a low pressure passage.

* * * * *